Feb. 18, 1964 R. CANTON 3,121,537
WATER OPERATED DEVICE WITH RECIPROCATING SHAFT
Filed March 30, 1962 2 Sheets-Sheet 1
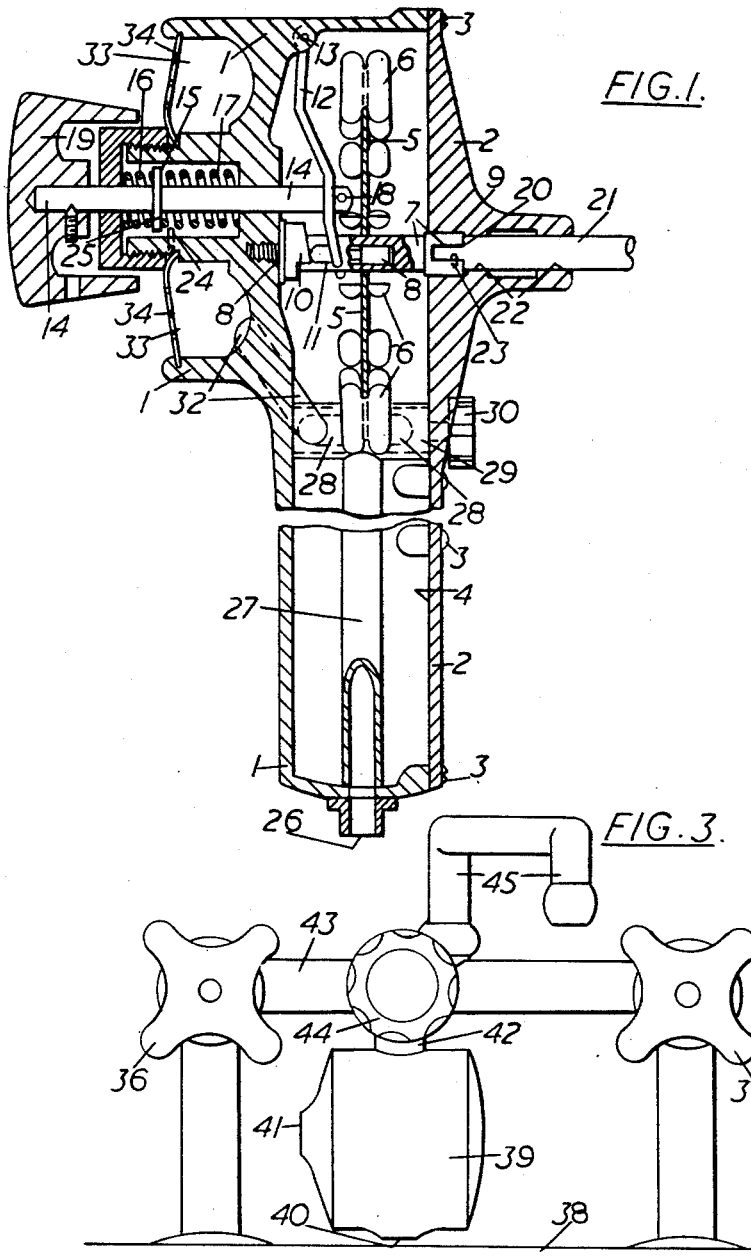
Inventor
RAYMONDO CANTON
By
William R. Liberman
Attorney

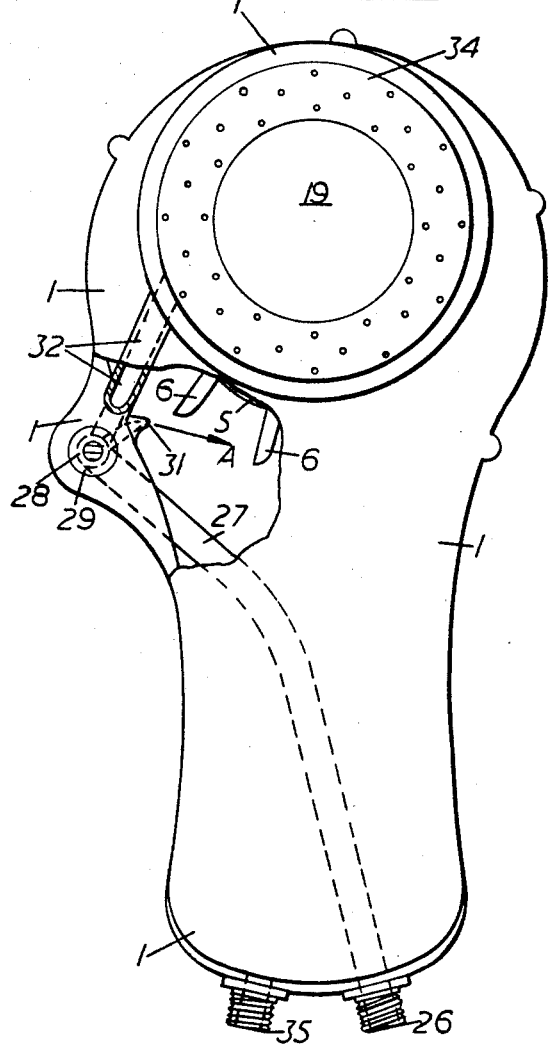

United States Patent Office 3,121,537
Patented Feb. 18, 1964

3,121,537
WATER OPERATED DEVICE WITH
RECIPROCATING SHAFT
Raymondo Canton, 109 McNeilage Road,
Salisbury, Southern Rhodesia
Filed Mar. 30, 1962, Ser. No. 183,824
Claims priority, application Rhodesia Apr. 14, 1961
2 Claims. (Cl. 239—289)

The present invention relates generally to household appliances and is particularly concerned with a means of operating a range of such appliances hydraulically, using the water pressure available from the domestic water supply.

It has been discovered that the water pressure from a normal domestic water supply may be used to operate a turbine, of a similar nature to the Pelton wheel, to provide sufficient rotary power to operate a variety of household appliances.

Initially envisaged is the operation of a massaging head, a dry-shaver and a food whisker and beater from the proposed power unit, but these examples should not be considered as restricting the application of the invention which may be equally applied to the operation of other mechanical appliances in the home.

In the case of the massaging head means are to be incorporated in the power unit whereby the rotary power is converted to oscillatory motion suitable for vibro-massage.

An additional feature of the invention is the incorporation of a shower for use in the bath. The shower is a direct delivery of water from the supply and a switch operating a by-pass valve is embodied in the power unit to direct the water either for the shower or to operate the turbine.

According to the invention a power unit for operating household appliances comprises a casing enclosing a turbine operated by one or more jets of water derived from a domestic water supply, a take-off point from the revolving shaft of said turbine adapted to provide rotary drive, means for obtaining oscillatory motion from the rotary movement of said turbine and provision within said casing for a separate chamber through which the water supply may be diverted, the outlet from said chamber directing the water as a shower.

The take-off point for rotary drive from the power unit may be a direct extension of the turbine shaft through the casing into a connecting socket which will readily receive a selected appliance to be operated. To obtain adequate power for a direct coupling between the turbine shaft and an appliance the turbine may consist of any number of wheels of the Pelton type mounted on the one shaft and propelled by independently operating water jets. To ensure the maximum efficiency from such a multiple arrangement of the turbine, the casing would be partitioned so that the resulting flow of water from the jets operating any one wheel would be confined and not permitted to impair the functioning of any other wheel.

Alternatively, the turbine shaft may be arranged to deliver power to the rotary drive through a reduction gear to achieve the necessary output. It should also be appreciated that a combination of these two features may be utilised to acquire an even greater power output.

The massaging head is preferably attached to a spring-loaded shaft receiving oscillatory motion from the rotation of the turbine shaft through a suitably arranged connection for transforming the rotary motion to reciprocatory motion. In this arrangement the massaging head may be permanently incorporated with the power unit but having a simple means of being disconnected from the turbine shaft when such is being used to power another appliance.

The casing for the power unit provides an inlet and outlet for the water supply in the form of externally arranged fittings for connecting flexible hoses. The inlet is connected by a hose to the water supply at the tap in the bathroom or kitchen and a hose fitted to the outlet will carry the spent water away into the sink or bath.

A further embodiment of the invention provides for the power unit casing to be integral with the plumbing for the kitchen water tap and for the power unit to have only one connection supplying rotary power either directly, or indirectly through gears, from the turbine shaft. The delivery of water from the supply to the power unit will be controlled through the kitchen tap and a simple valve will be incorporated to shut off the water supply to the normal tap outlet and direct it to the turbine. A flexible power transmission cable will be connectable between the power unit rotary drive connection and an appliance to be operated.

The invention is further explained in the following description, given by way of example and with reference to the accompanying drawings, in which—

FIGURE 1 shows a pictorial sectional side view of the power unit incorporating a vibro-massage head and shower;

FIGURE 2 is a front view of the power unit referred to in FIGURE 1, partly cut away to reveal the relative position of a nozzle and the buckets of the turbine at which it directs a jet of water; and FIGURE 3 illustrates a further embodiment of the power unit incorporated in the plumbing for a kitchen sink.

Referring to FIGURES 1 and 2, the casing for the power unit consists of a moulding 1 and a cover 2 fastened together by screws 3 and enclosing a gasket 4 to ensure a watertight joint. A turbine comprising a circular plate 5 supporting about its periphery a series of buckets 6, revolves on a shaft 7 freely mounted on an axle pin 8 fixed to the moulding 1 and in a bearing 9 provided by the cover 2. At one end, the shaft 7 has a fixed collar 10, so shaped that it will impart reciprocating motion to the pin 11 as it revolves. The pin 11 is integral with a pivot arm 12 hinged at a point 13 on the moulding 1. A second shaft 14 is caused to oscillate by virtue of its relationship with the reciprocating motion imparted to the pivot arm 12. The shaft 14 has a fixed collar 15 by which it is retained between two springs 16 and 17. One spring 16 serves to cushion the oscillations of the shaft 14 and the other spring 17 holds a pin 18, set in the end of the shaft 14, against the pivot arm 12 thus enabling the transverse of motion from the pivot arm 12 to the shaft 14. The oscillatory motion of the shaft 14 is directly imparted to a massaging head 19 suitable for vibro-massage.

Direct rotary power from the turbine shaft 7 is provided by a dog coupling 20 at the end thereof which rotates in the bearing 9. The shaft 21 shown in FIGURE 1 represents a common shaft which will be incorporated in each appliance of a range designed to be operated by the power unit rotary drive. When an appliance is to be powered its shaft will be inserted as the shaft 21 is shown through the bearing surfaces 22 of the cover 2 to engage the dog coupling 20 which also provides a spring catch 23 for retaining the coupled shaft during operation of the appliance.

To avoid power loss in operating the massaging head 19 when only the rotary drive from the dog coupling 20 is required a simple lock is provided, to disengage the massaging head 19, in the form of a pin 24 protruding from the moulding 1 at a point just beyond the normal span of travel of the fixed collar 15 and a slot 25 in the collar 15. The massaging head 19 is turned to align the slot 25 with the pin 24 and then depressed until the collar 15 has passed the pin 24. The massaging head 19 is again turned to mis-align the slot 25 and pin 24 and then released so that the massaging head 19 will remain in the depressed position and disengaged from the power supply.

The domestic water supply, supplying the water under pressure to operate the power unit is obtained from a tap in the kitchen or bathroom, depending on the appliance being used. The water supply from the tap is connected by a suitable hose to the inlet 26 in the power unit casing and from there directed through a pipe 27 into a valve chamber 28. The valve 29 may be turned to either of two set positions by a knob 30 located outside the power unit casing. In one position the water is directed to the nozzle 31 from which a jet of water will issue in the direction of the arrow "A" shown in FIGURE 2. The result of the force of this jet impinging the buckets 6 will turn the turbine and so provide the power to rotate the shaft 7. In the other position the water will be directed through a short duct 32 in the moulding 1 to a cavity 33. This cavity 33 is enclosed by a perforated plate 34 through which the water will issue as a shower for use in the bathroom.

When the turbine is in use the spent water from the buckets 6 is thrown by centrifugal force onto the inside of the power unit casing and runs down to the outlet 35. The outlet 35 may be connected to a suitable hose which will drain the water away into the sink or bath.

FIGURE 3 shows a cold tap 36 and hot tap 37 at a sink 38 with an arrangement of a power unit constructed to provide only the rotary drive. The turbine is enclosed in the housing 39 which has an outlet 40 for the spent water and a rotary power take-off connection at 41. The water supply pipe 42 to the turbine is connected to the delivery pipe 43 from the cold tap 36. At the junction of these two pipes a by-pass valve operated by a control knob 44, is situated by which the water from the cold tap 36 can be shut off from the sink outlet pipe 45 and directed through the supply pipe 42 to the turbine. The cold tap 36 is then used to control the operation of the turbine.

This particular arrangement of the invention is designed to operate a range of kitchen appliances such as a whisk, a cake beater or a food liquidizer. The appliances would be connectable to a flexible power transmission cable which in turn would be connected to the rotary power take-off connection 41 in the turbine housing 39.

I claim:

1. A water driven power unit for use with a faucet comprising a housing, a water wheel located in said housing, a rotary drive shaft affixed to said water wheel and projecting through said housing, a slidable shaft carried by said housing, a motion translating mechanism coupling said slidable shaft to said water wheel to impart reciprocating motion to said slidable shaft with the rotation of said water wheel, a nozzle directed at said water wheel, a water outlet, an inlet pipe connected to said housing, a valve selectively alternatively connecting said inlet pipe to said nozzle and said water outlet, means for selectively disabling said motion translating mechanism and decoupling said slidable shaft from said water wheel, and means for releasably locking said slidable shaft in decoupled position.

2. The water driven power unit of claim 1, wherein said water outlet is defined by a shower head.

References Cited in the file of this patent
UNITED STATES PATENTS

| | | |
|---|---|---|
| 806,785 | Divine | Dec. 12, 1905 |
| 1,088,242 | Rudolph | Feb. 24, 1914 |
| 2,763,461 | Hill | Sept. 18, 1956 |
| 2,905,171 | De Crescenzo | Sept. 22, 1959 |

FOREIGN PATENTS

| | | |
|---|---|---|
| 501,166 | France | Jan. 19, 1920 |